United States Patent
Knowlton et al.

(10) Patent No.: US 7,040,074 B2
(45) Date of Patent: May 9, 2006

(54) VACUUM PACKAGING APPARATUS AND METHOD

(75) Inventors: Scott Knowlton, Blue Springs, MO (US); Timothy A. Grove, Independence, MO (US)

(73) Assignee: Koch Equipment LLC, Kansas City, MO (US)

( * ) Notice: Subject to any disclaimer, the term of this patent is extended or adjusted under 35 U.S.C. 154(b) by 0 days.

(21) Appl. No.: 10/691,244

(22) Filed: Oct. 22, 2003

(65) Prior Publication Data

US 2004/0168404 A1   Sep. 2, 2004

Related U.S. Application Data

(63) Continuation of application No. 10/085,447, filed on Feb. 28, 2002, now abandoned.

(51) Int. Cl.
*B65B 31/00* (2006.01)

(52) U.S. Cl. ............... 53/413; 53/79; 53/97; 53/134.1; 53/403; 53/434; 383/7

(58) Field of Classification Search .............. 53/79, 53/97, 105, 134.1, 403, 408, 413, 434, 512; 383/6, 7

See application file for complete search history.

(56) References Cited

U.S. PATENT DOCUMENTS

| | | | | |
|---|---|---|---|---|
| 3,469,364 A | * | 9/1969 | Bischoff ...................... 53/469 |
| 3,688,463 A | * | 9/1972 | Titchenal ..................... 53/434 |
| 3,958,391 A | * | 5/1976 | Kujubu ......................... 53/434 |
| 4,189,897 A | * | 2/1980 | Ailey et al. ................... 53/434 |
| 4,555,025 A | * | 11/1985 | Weinberg et al. ........... 206/497 |
| 4,779,398 A | * | 10/1988 | Glandon et al. .............. 53/434 |
| 5,056,292 A | * | 10/1991 | Natterer ......................... 53/86 |
| 5,682,727 A | * | 11/1997 | Harte et al. ................... 53/434 |

* cited by examiner

*Primary Examiner*—John Sipos
*Assistant Examiner*—Christopher Harmon
(74) *Attorney, Agent, or Firm*—Hovey Williams LLP (57) ABSTRACT

A combined cutting blade and heat bar for use with a vacuum packaging device having a lid for sealing over the cavity of a base is disclosed. The cutting blade and heat bar are connected to one another and movable via a single actuating mechanism mounted to the lid. In use, in one step the combined mechanism is lowered with the heat bar unheated and the cutting element cuts slits in the bag for evacuation of the air. After air evacuation, the combined mechanism is lowered with the heat bar heated, melting the bag closed behind the slitted area of the bag.

7 Claims, 8 Drawing Sheets

VACUUM PACKAGING APPARATUS AND METHOD

This application is a Continuation of application Ser. No. 10/085,447, filed Feb. 28, 2002, now abandoned.

BACKGROUND OF THE INVENTION

A. Field of the Invention

The present invention relates to a mechanism for use with a vacuum packaging apparatus. More particularly, the invention is a combined cutting blade and heating bar for use in cutting and sealing vacuum packing bags, and in particular, oversized compressible content in vacuum packing bags.

B. Description of the Related Art

Manufacturers often desire to package their products in air-tight or shrinked wrapped bags. For example, a manufacturer may wish to seal a food product in an air-tight package to ensure its freshness or may wish to vacuum pack a compressible product in order to reduce the size of the packaging. Also, it is sometimes either expensive to package a product in a box or desirable to visibly display the product. In these cases, the manufacturer may shrink-wrap the product in a clear plastic bag. This type of packaging allows the consumer to see the product, protects the product during shipping and, in certain instances, when the content can be compressed through the vacuum packaging process, reduces the size of the package.

Currently, machinery is available for packaging products in air-tight bags. This machinery typically comprises a base member having an upstanding wall defining an internal cavity in which a bagged product may be placed. A lid is movable over the base, the lid having a perimeter sealing element for forming a seal against the top of the wall of the base.

A movable heated element is connected to the lid. The heated element can be extended downwardly against a portion of the base. Means are provided for evacuating the air from the cavity.

The prior teaches several ways in which to pull vacuum through the bag and seal the container. One such approach is to place the bag in the cavity of the base, such that the open end of the bag is oriented so that it extends across a portion of the base, with the free end also located in a slot within the cavity. Thus the entire bag is placed within the cavity.

Once the bag is placed in the cavity, the lid is lowered and sealed against the base. The cavity and thus the bag therein, is evacuated of air. The air leaving the bag through its open end located within the cavity. Evacuation of the air in the bag draws the bag tightly around the product and itself. The heated element is then heated and lowered against the bag. The heat element melts the bag distal of its open end, sealing it shut. Air is returned to the cavity, the lid opened, and the product is removed.

This packaging arrangement suffers the drawback that the entire bag must be located in the cavity in order to evacuate the air therein. When there is excess bag to wrap the product, the bag material is bunched around and often extends from the product. This bag material increases the total size of the package, and is visually unappealing. Furthermore, this type of machine is not well suited to package large items by reducing the size of the items by pulling a vacuum through the package. This system would tear the pouch completely loose during the initial vacuum draw down and disrupt the packaging cycle.

To overcome the drawback of bunching when excess baggage is used, other vacuum packaging machines were designed to allow a user to leave the end of the bag outside of the chamber during air evacuation. When using this type of device, the user places the product in the bag and pulls the end of the bag outside of the base. The user pulls the bag firmly outwardly, pulling the bag tightly around the product in the chamber, leaving only the amount of bag necessary to wrap the product around the product.

Figure 2:
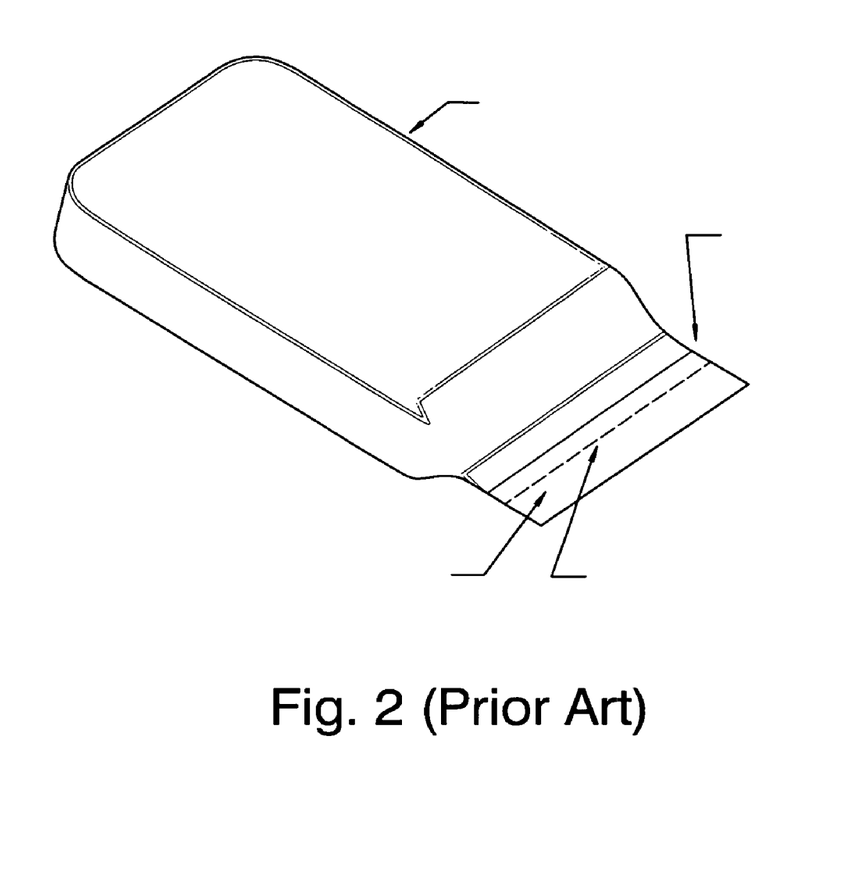
FIG. 2 is a top perspective view of a bag sealed using a prior art vacuum packaging machine.

The user then lowers the lid, tightly holding the bag in place, preventing it from slipping back down into the chamber around the product. The vacuum packaging machine includes a segmented cutting blade and heating element for use with the vacuum packaging device, which may be connected to a single actuating device, or each connected to their own actuating devise. In either case, when the lid is closed, the segmented cutting blade, which extends almost entire across the width of the first vacuum package machine, cuts segmented portions of the bag located inside of the chamber, as illustrated by FIG. 2 (Prior Art). The cuts are segmented so that the bag, when cut, does not slip back down into the chamber around the product, but so that the excess bag can be easily removed from the bag containing the product after the bag is sealed.

Once the bag is cut, the air in the chamber and in the bag located inside of the chamber is evacuated, the air escaping from the bag through the cuts. After the vacuum is pulled through the chamber, the heating element is lowered, melting the bag distal of the cut made in the bag and sealing it shut, as illustrated by FIG. 2 (Prior Art). The product is then removed from the container and the excess bag on the free end away from the seal is then removed.

Like the vacuum packaging machine having the entire bag located in the cavity, the machines allowing for the open end of the bag located outside the chamber, also suffer the difficulty of packaging large condensable items by pulling a vacuum through the package and thereby causing the packaging to condense the product in the package. For example, such items subject to reduction though vacuum packaging are clothing, outdoor wear, sleeping bags and other flexible, resilient compressible materials. Under high vacuum packaging, such fabric derived products will compress in size by up to 30% of their original volume.

The prior art vacuum packaging machines are not currently equipped to accommodate these type of compressible products. The prior art vacuum packaging machines, as discussed above, pulls a small vacuum to hold the chamber closed when the lid is initially shut and to create a seal between the lid and the base. In the case of packaging large pouches with sleeping bags or other like large clothing articles, this system would tear the pouch completely loose during the initial lid vacuum draw down and disrupt the packaging cycle.

SUMMARY OF THE INVENTION

The present invention is a vacuum packaging machine that is designed to handled packages containing product that will compress in volume during packaging. The vacuum packaging device of the present invention has a base and lid. A cavity is located in the base in which a product to be packaged is positioned. The lid has a perimeter seal for sealing the lid over the cavity in the base. The device further includes an apparatus for evacuating air from the sealed cavity and the bag inside.

The vacuum packaging machine of the present invention has an elongated segmented cutting blade that is located in the center of the seal bar and is sized to leave sections of uncut pouch material on either side of the pouch. Thus, the length of the blade is less than the length of the bag.

The vacuum packaging machine also includes a heating element, which is used to seal the bag after the air is removed from the bag. In one embodiment of the invention, the cutting blade and heating element are connected to one another and to a mounting bar, which is connected to a single actuating device. This entire mechanism is mounted preferrable to the lid. On the base, opposite of the mechanism, is an anvil, for engagement by the cutting blade and heating bar.

Accordingly, during the packaging process, a user places product in a bag, extending the open end of the bag across the anvil and positions the open end of the bag outside of the base, leaving the remainder of the bag containing product in the cavity of the base.

The user then closes the lid and a slight vacuum is drawn to seal the lid tightly against the base. With the bar unheated, the combined cutting mechanism and heating bar is then lowered, via the actuator, to cut spaced slits across a portion of the bag, leaving uncut sections of the bag. Leaving sections of uncut bag on either side of the bag prevents the pouch trim from tearing both during the vacuum packaging process and thereafter. The cutting and heating mechanism is then retracted.

The vacuum device then evacuates the air in the bag, compressing the contents of the bag when compressible materials are being packaged. The air in the bag escapes through the slits formed by the cutting blade in the portion of the bag that is cut. The cutting and heating mechanism is then lowered, this time with the heating element heated, thereby sealing the end of the bag after the air has been fully evacuated from the bag. While the cutting the bar does not extend the length of the bag, the heating element does extend across the length of the bag, thereby sealing the bag across its entire length to prevent the re-entry of air into the bag.

Since the cutting element did not cut through the entire length of the bag, the excess pouch, instead of being removed, would remain with the bag. The excess bag, having a slit through only the mid-section, can then serve as a handle to the bag, which functions as an especially convenient way to carry light or large items.

BRIEF DESCRIPTION OF THE DRAWINGS

A more complete appreciation of the invention and many of the advantages thereof will be readily obtained as the same becomes better understood by references to the detailed description when considered in connection with the accompanying drawings, wherein:

FIG. 9 is an enlarged end view of the apparatus illustrated in the position of FIG. 8 through line 9—9 thereof; and FIG. 10 is an enlarged cross-sectional end view of the apparatus in the position of FIG. 8 through line 10—10 thereof.

DETAILED DESCRIPTION OF THE PREFERRED EMBODIMENT

Figure 1:
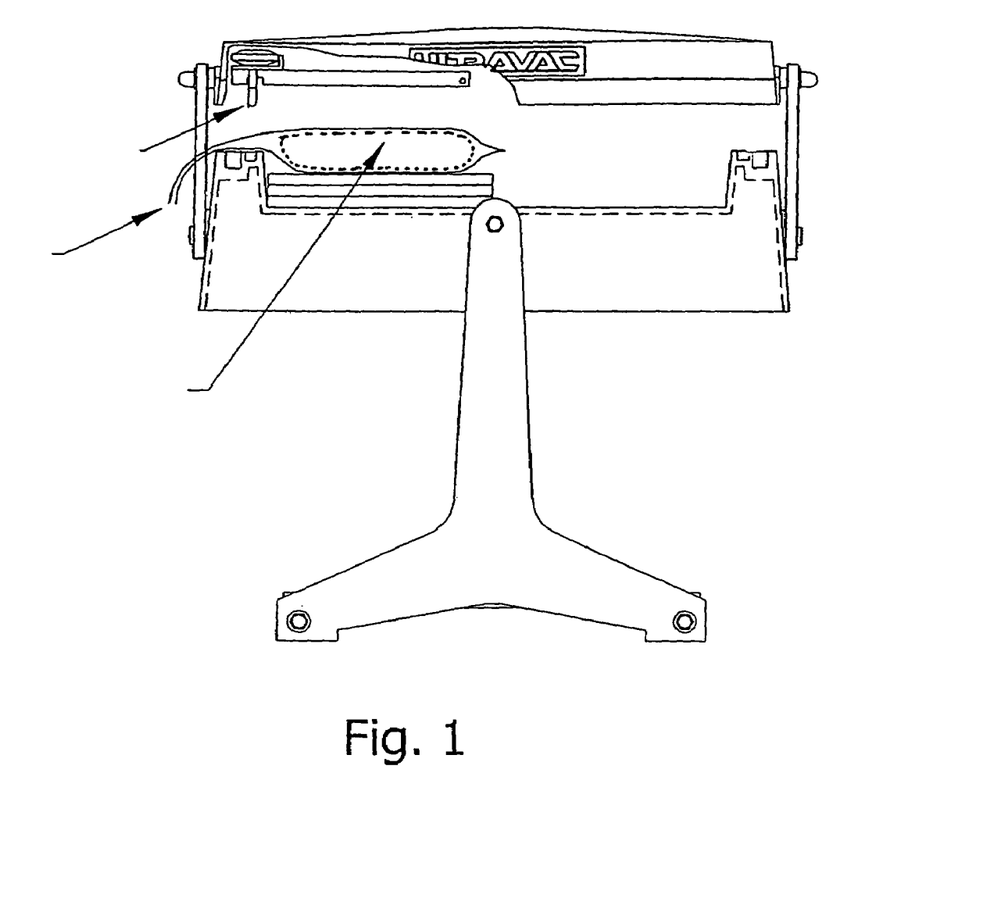
FIG. 1 is a front view of the vacuum packaging device in one embodiment of the invention with the lid of the vacuum packaging device partially open and having part of the lid partially cut away to show the combined heating bar and cutting blade and the positioning of the bag relative thereto.

As illustrated by FIG. 1, the present invention is a vacuum packaging machine 18 that is designed to vacuum pack products that are not subject to reduction, such as food products, as well as items that are subject to reduction through vacuum packaging, such as clothing, outdoor wear, sleeping bags, other fabric derived products and other flexible, resilient compressible materials.

As illustrated by FIGS. 1 and 4–10, the vacuum packaging machine 18 of the present invention generally comprises a base 20, having a cavity 24 located therein, and a lid 22 that seals over the cavity 24 of the base 20. The cavity 24 is formed within an upstanding wall 26 of the base, the cavity having an open top end 28. The wall 26 has a flat top surface 30. At least a portion of the wall 26 includes a slot 32 in which a portion of a packaging bag 21 may be positioned.

The lid 22 has a mating surface for engagement with the top surface 30 of the wall 26 of the base 20, the lid 22 designed for use in enclosing the cavity 24 in the base. A seal 34 is positioned in the lid 22 for engagement with the top surface 30 of the wall 26 for sealing the lid to the base. The machine 18 includes means (not shown) for evacuating the air from the enclosed cavity 24, as is well known in the art.

In accordance with one embodiment of the invention, the combined cutting blade 10 and heat bar 12 are mounted to the lid 22 of the vacuum packaging apparatus 18. The cutting blade 10 and heat bar 12 are connected to the actuating means 14, namely an expandable air bladder 36, for movement with respect to the lid.

Figure 3:
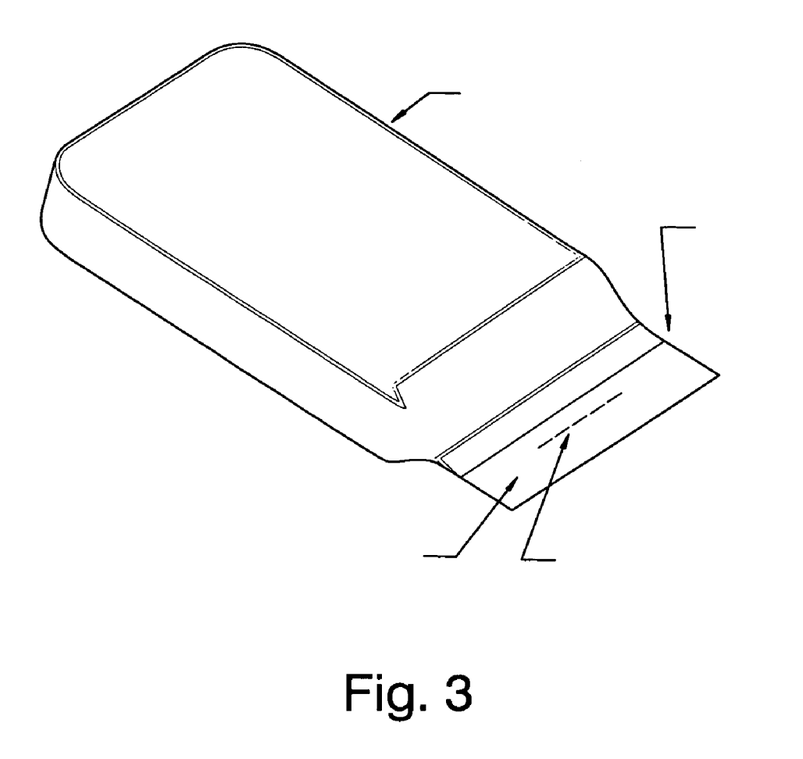
FIG. 3 is a top perspective view of a bag sealed using a vacuum packaging machine of the present invention.
Figure 7:
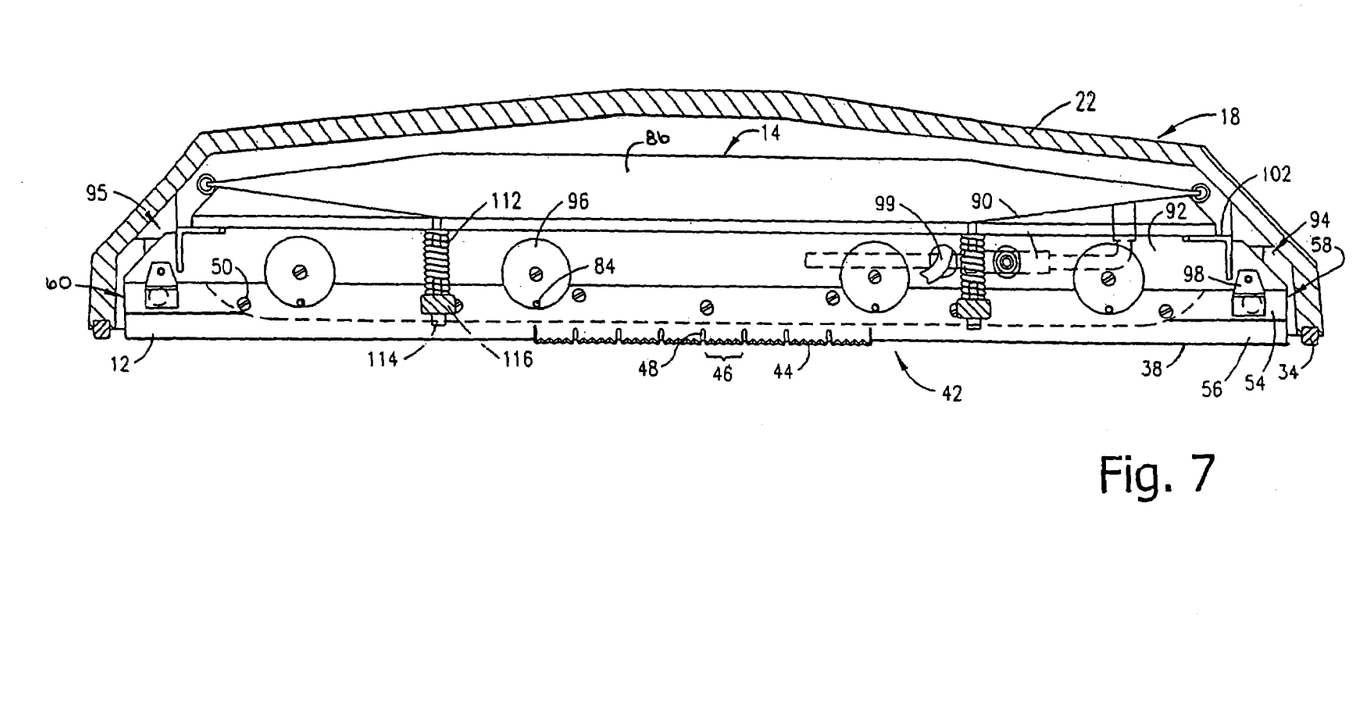
FIG. 7 is a cross-sectional side view of the apparatus of FIG. 6 taken along line 7—7 thereof.
Figure 8:
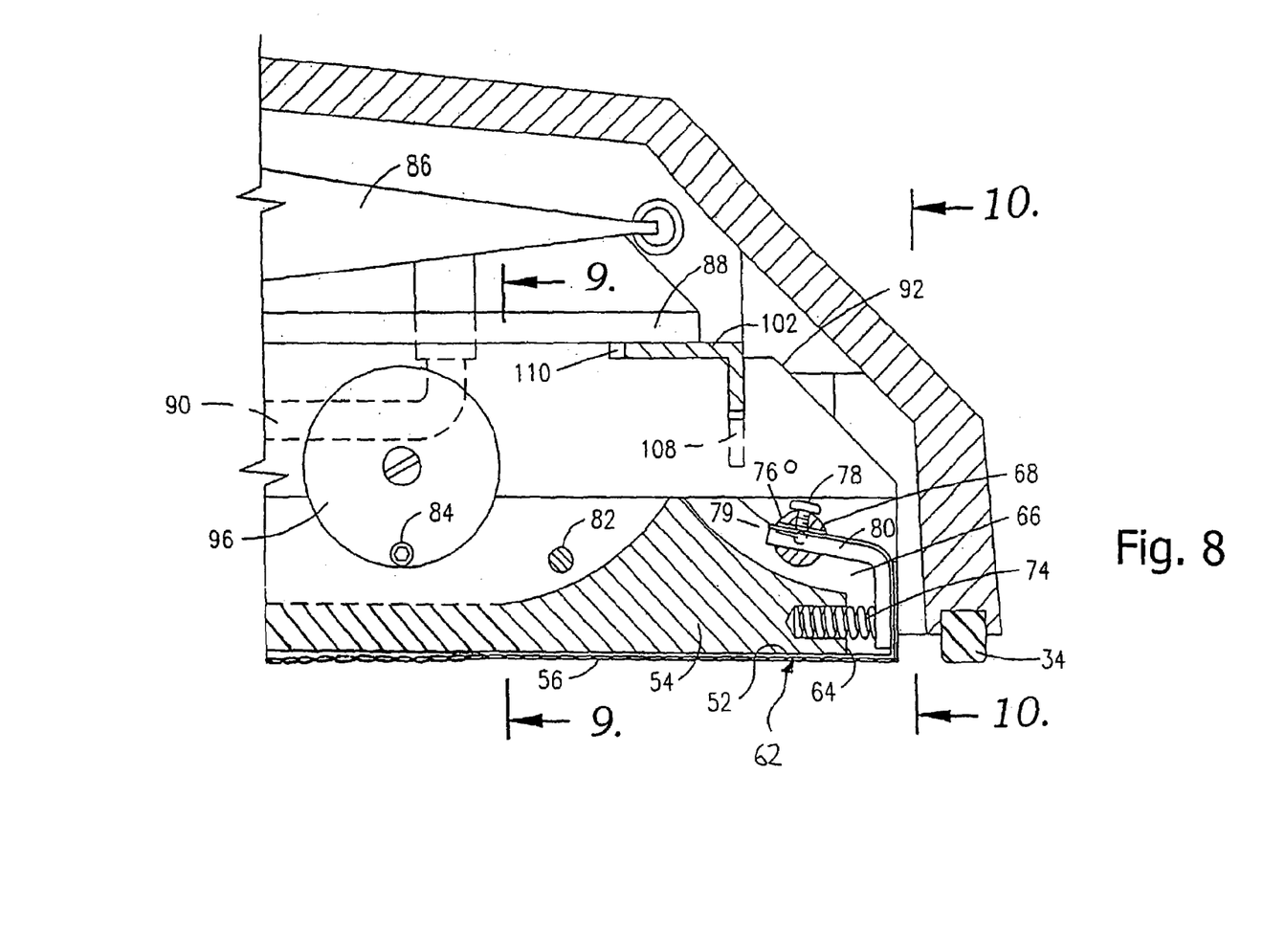
FIG. 8 is an enlarged, partial cut-away side view of the combined cutting blade and heat bar of FIG. 4.

In one embodiment of the invention, as illustrated by FIG. 7, the heating bar extends across the entire length of the lid, whereas the cutting blade is positioned in the center of the lid and is of a length that will not cut across the entire packaging bag, but rather cuts only across the middle portion of the bag, as shown by FIG. 3, leaving uncut portions at the ends of the bag.

As best illustrated in FIGS. 4–7, the cutting blade 10 comprises an elongate, thin metal member having a first side 38, second side 40 and cutting edge 42. While the cutting blade may be a straight edge, typically, the cutting blade used has a number of cutting teeth 44 are disposed along the cutting edge 42 of the blade 10, so that the cutting blade does not cut a packaging bag 21 completely through, but instead cut the bag so that several portions of the bag remain unsevered.

As such, the cutting teeth 44 are arranged so that the blade 10 acts to cut the bag in certain areas but not others (as shown in FIG. 3). Preferably, the sets 46 of the cutting teeth 44 are separated by non-cutting slot 48 areas extending upwardly into the blade from the cutting edge. Again, it is not necessary to use a blade with non-cutting slots 48 since the blade does not extend across the entire length of the bag.

The cutting teeth 44 are preferably only disposed on the first side 38 of the cutting blade 10, the second side 40 of the blade being flat. The cutting teeth 44 preferably have a cutting edge slope of about 60 degrees (sloping inwardly from the first side to the second side of the blade from the top of the tooth downwardly towards the cutting edge).

In one embodiment, each cutting tooth 44 is approximately 0.2 inches wide. The tooth 44 has a minimum tooth height of about 0.04–0.06 inches, and most preferably about 0.05 inches, and a maximum tooth height of about 0.145–0.165 inches, and most preferably about 0.155 inches.

The blade 10 may be constructed of any number of durable materials, but is preferably constructed from stainless steel. The blade 10 in the present example is about 7 inches long. The length of the blade 10 may vary, however, dependent on the application for which it is used and the size of the packaging bag being used in the machine.

A number of apertures extend through the blade 10. Screws 50 or similar mounting elements pass through the apertures for engagement with a base 54 of the heat bar 12, for mounting the blade to the actuating mechanism 14 (indirectly) as described in more detail below. The depth of the blade 10 and its point of attachment are chosen so that the ends of the teeth 44 extend below the bottom of the heat bar 12 by approximately 0.05–0.15 inches, and more preferably, about 0.1 inches, when the teeth have the configuration described above.

The heat bar 12 comprises a heat wire 52 mounted in the base 54. A cover 56 extends over the heat wire 52, preventing direct contact of the heat wire 52 with the bag 21.

The base 54 comprises an elongate mounting member having a first end 58 and second end 60. Preferably, the base 54 is constructed of a lightweight resin material. In order to stiffen the base 54, an insert 55 (as best seen in FIG. 7), such as a metal bar, fits within a slot in the base 54.

Figure 5:
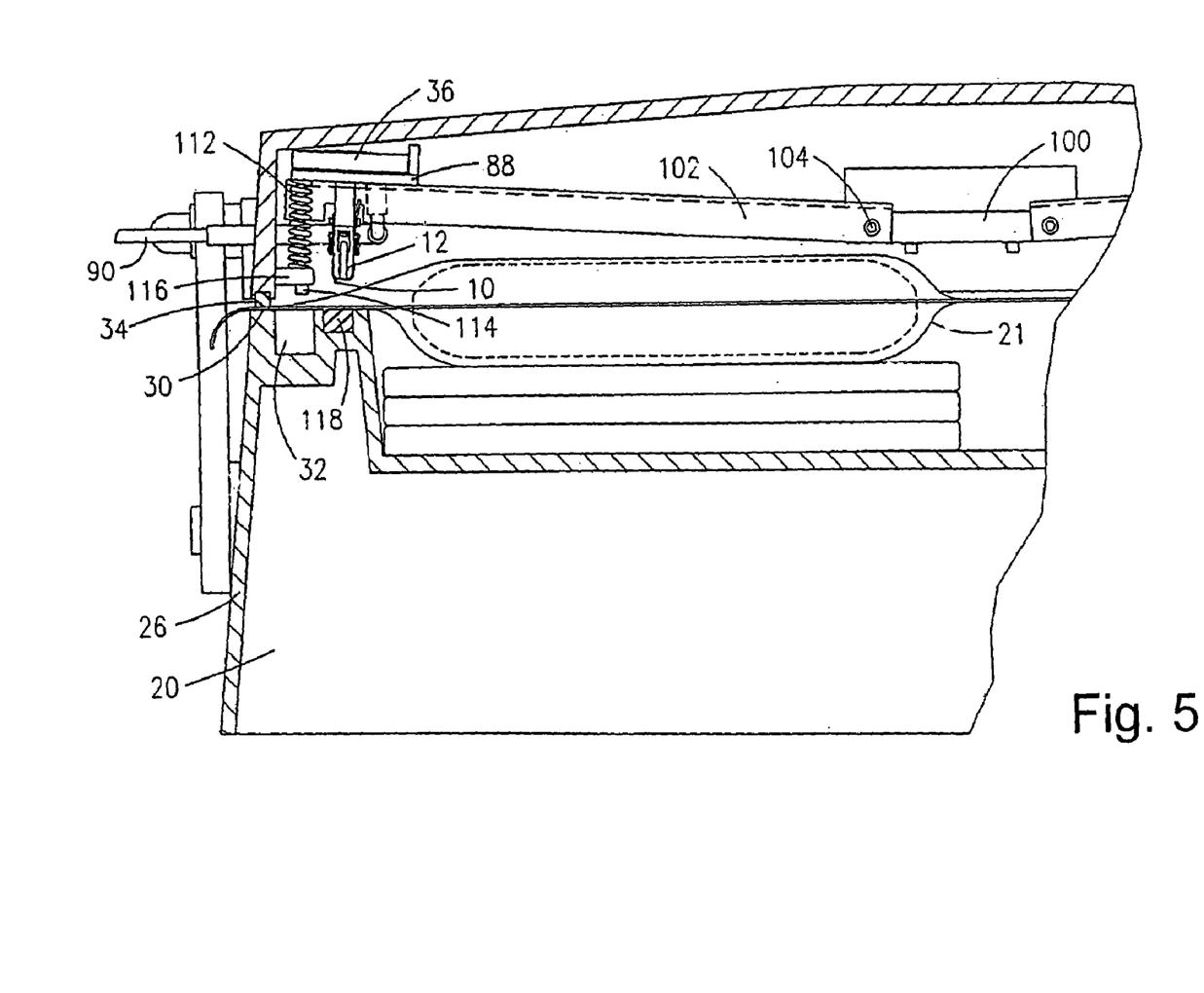
FIG. 5 is a view of the apparatus of FIG. 4, with the lid of the vacuum packaging device closed and the combined cutting blade and heat bar shown in a retracted position.

The base 54 is preferably slightly longer than the heating wire, at about 27.25 inches. As best illustrated in FIGS. 5 and 7, a first slot 62 extends through the base 54 from end to end 58, 60. The first slot 62 is preferably located adjacent a bottom edge 64 of the base 54 and receives the heat wire.

A second slot 66 extends into each end 58, 60 of the base 54 above the first slot 62. An aperture 68 extends through the base 54 from side to side at the location of the second slot 66.

The wire 52 has a first end and a second end, corresponding to the ends 58, 60 of the base 54. The wire 52 is preferably constructed of metal, and has a rectangular cross-section. At its ends the wire 52 first bends upwardly for extension along the ends 58, 60 of the base 54, and then bends inwardly.

To support the ends of the wire 52 and retain the wire in place, the wire extends over a lock bar 80 at each end. Preferably, the supporting/attaching structure is the same at both ends of the wire 52 and bar, and thus only one end will be described. As illustrated in FIG. 5, the lock bar 80, which is generally 'L'-shaped, extends from a slot in a pin 76 passing through the aperture 68. A set screw 79 extends inwardly from one side of the pin 76, engaging the lock bar 80 and retaining it in place. From the pin, the lock bar 80 extends outwardly towards the first end 58 of the base 54, and then downwardly towards the bottom edge 64.

The heat wire 52 extends upwardly over the lock bar 80 within the slot 66. The first end of the wire 52 is retained against the lock bar 80 and in the pin 76 via a set screw 78 which passes downwardly from the top edge of the base 54.

As illustrated in FIG. 5, a spring 74 extends between the end of a countersunk bore in the base 54 near the second slot 66 and the lock bar 80, pressing the lock bar 80 outwardly against the heat wire 52.

A cover 56 extends over the bottom edge 64 of the base 54 from the first to the second ends 58, 60. The cover 56 is preferably a Teflon(tm) tape formed into a 'U'-shape. The tape is connected to each side of the base 54 and extends across the bottom edge 64 of the base 54.

As illustrated, the front side of the base 54 has an inset area for acceptance of the cutting blade 10. A first number of apertures 82 pass through the base 54 of the heat bar 12 at the inset area. The first set of apertures are designed for acceptance of the screws 50 (or other mounting members) which connect the cutting blade 10 to the base 54.

A second number of apertures 84 pass through the base 54 of the heat bar 12 slightly above the first set. The second set of apertures 84 are designed for mounting the heat bar 12 (with blade connected thereto) to the actuating mechanism 14, as described below.

Figure 4:
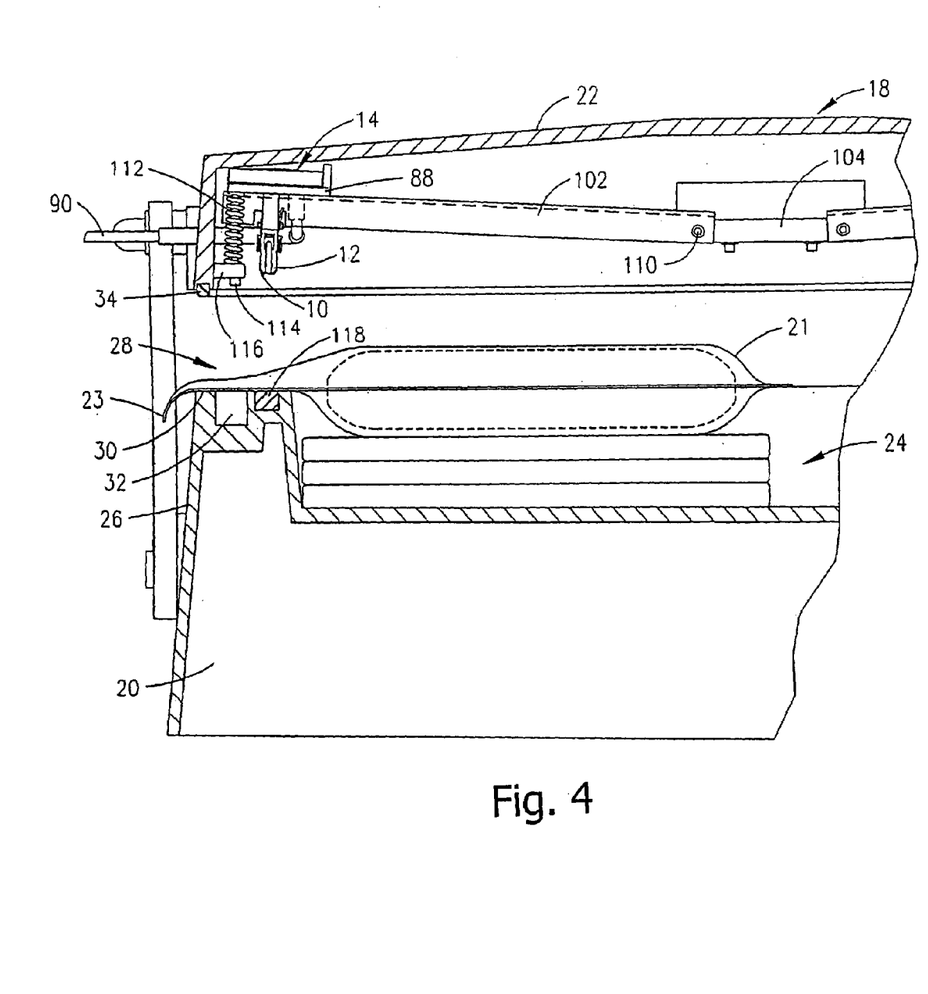
FIG. 4 is an end view of the combined cutting blade and heat bar apparatus of the present invention mounted in a vacuum packaging device (shown in cross-section) and shown with a lid of the device open.
Figure 6:
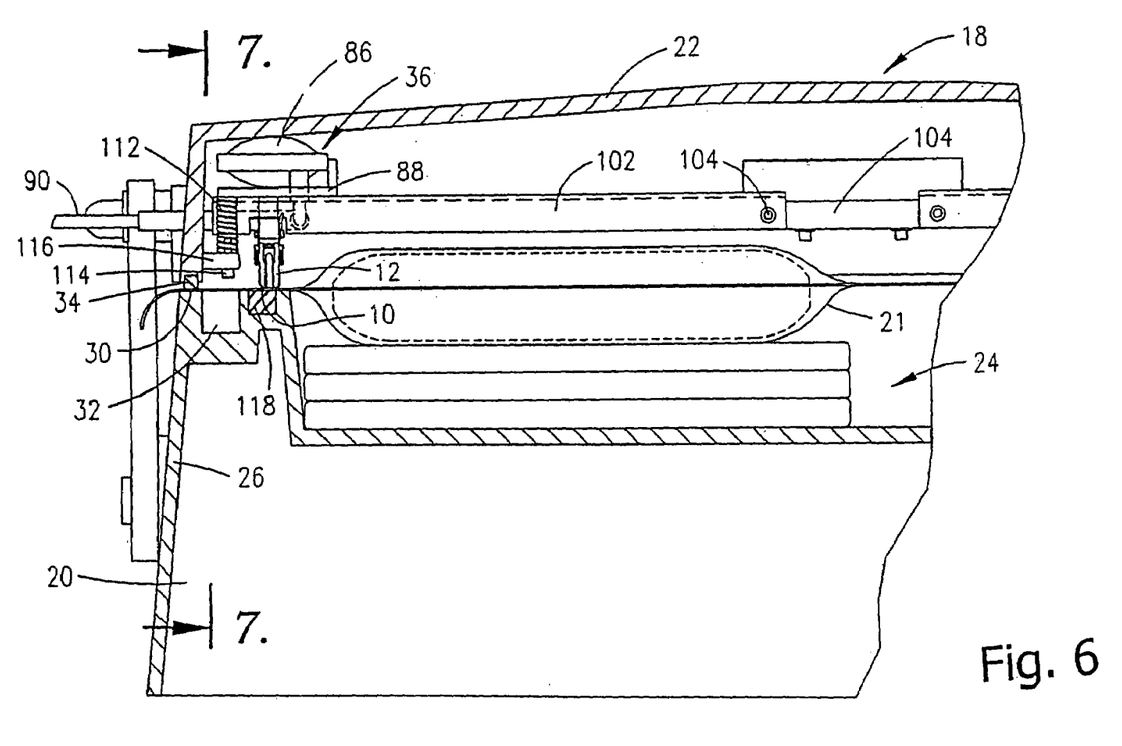
FIG. 6 is a view of the apparatus of FIG. 5 with the combined cutting blade and heat bar shown in an extended position.

As best illustrated in FIGS. 2, 4 and 6, the actuating mechanism 14 comprises a means for moving/actuating the combined cutting blade 10 and heat bar 12 between a first (retracted) and a second (extended) position. Preferably, the actuating mechanism 14 comprises an air bladder 36. The air bladder 36 includes an inflatable element 86, such as a section of firehose or similar durable expandable material. The inflatable element 86 is mounted on a plate 88 having a flat surface and upstanding inside protective edge.

An air line 90 extends through the lid 22, an aperture in the plate 88, and into the inflatable element 86 of the air bladder 36. The air line 90 is connected to a source of high and low pressure air (not shown) for inflating and deflating the air bladder 36.

The air bladder 36 is connected to the cutting blade 10 and heat bar 12 via a mounting bar 92, as illustrated in FIGS. 4 and 7. The mounting bar 92 is approximately as long as base 54 of the heat bar 12 and thus slightly longer than the cutting bar 10. The mounting bar 92 has a first end 94 and second end 95 which are tapered to facilitate retraction of the mechanism along the sloping ends of the lid 22 of the vacuum packaging device 18, as best illustrated in FIG. 4.

Preferably, four large washers 96 are connected to each side of the mounting bar 92 with screws or the like. The base 54 of the heat bar 12 (to which the cutting blade 10 is connected by screws 50) is connected to the washers 96 with screws passing into the apertures 84 described above.

The mounting bar 92 is in turn connected to the flat portion of the plate 88 of the air bladder 36. Screws or similar attachment means pass through the plate 88 along its length and into mating apertures in the top edge of the mounting bar.

As connected, the mounting bar 92, the heat bar 12 and the cutting blade 10 move as one element as actuated by the air bladder 36, as described in more detail below. Thus, the cutting blade and heat bar are actuatingly coupled.

A wire 99 from an electrical power source (not shown) extends to electrical contact elements 98 connected to the mounting bar 92. Each contact element 98 has a first flat section which is attached, via a screw or the like to the mounting bar 92. Each element further includes a 'U'-shaped, spring section. As illustrated, the spring section of the elements 98 contact the pin 76 to which the heat wire 52 is connected. The wire 99 is connected to the elements 98 for heating the heat wire 52. The elements 98 are mounted beyond the ends of the cutting blade 10, so as to not contact the cutting blade.

The entire mechanism is preferably hingedly connected to the lid 22 of the vacuum packaging device 18, as best illustrated in FIGS. 1–3. Two mounting blocks 100 (only one of which is illustrated) are connected to the inside of the lid 22 of the vacuum packaging device 18. An arm 102 extends from each mounting block 100 to a connection with the mounting bar 92 and plate 88.

Each arm 102 has a generally 'L'-shaped cross-section, and is generally about 15–16 inches, and most preferably about 15.75 inches long. The length of the arm 102 depends primarily on the size of the lid in which the mechanism is mounted. Preferably, the arm 102 is connected at one end to the mounting block 100 near the center of the lid. The arm 102 is long enough that the combined cutting blade 10 and heat bar 12 are positioned adjacent the outer edge of the lid 22, as illustrated in FIG. 1. The arm 102 is hingedly connected to the mounting block 100 at a first end via a pin 104.

The second end of each arm 102 is connected to the ends, respectively, of the flat portion of the plate 88 (see FIG. 5). The arms 102 are connected to the plate 88 with screws or similar attachment means.

The second end of each arm 102 includes a slot 106 (FIG. 6) for mating engagement with a corresponding slot 108 (FIG. 7) in the top edge of the mounting bar 92. Preferably, the slot 106 in the arm 102 is longer than the mounting bar 92 is wide, and the slot 108 in the mounting bar 92 is deeper than the depth of the downwardly extending portion of the arm 102, to facilitate relative movement of the two elements. Further, in order to accommodate mounting of the arm 102 under the plate 88 and between the plate and mounting bar 92, the mounting bar includes a recessed top edge section 110 at each end.

Springs 112 bias the mechanism upwardly into a recessed position within the lid 22 when the air bladder 36 is deflated, as illustrated in FIGS. 1 and 3. Preferably, two pins 114 (see FIG. 4) extend downwardly from the plate 88 and engage a flange 116 extending inwardly from the inside surface of the lid 22. The springs 112 are mounted on the pins 114 between the flange 116 and plate 88.

An anvil 118 is positioned in the wall 26 of the base 20 of the vacuum packaging apparatus 18 directly below the cutting blade 10, as illustrated in FIGS. 1 and 2. Preferably, the anvil 118 comprises an elongate segment of neoprene extending within a slot in the wall 26 along that portion of the wall 26 beneath the mechanism of the present invention.

While one embodiment to the present invention uses a combination heating bar and cutting blade, actuated by a single actuator, such as a air bladder, or other similarly functioning devise, the present invention may also utilize a heating bar that is separately actuated from the cutting blade. Furthermore, one skilled in the art can modify the arrangement of the cutting blade and the heating bar to be utilized in a chamberless vacuum packaging machine or in other types of vacuum packing machines.

In operation, a user will first select the appropriate length of the blade to be used in the vacuum packaging process. This is determined by the size the of vacuum packaging bad and article to be packaged therein. The length of the blade should be selected so that the blade leaves enough pouch trim on each side of the cut to prevent the bag from pulling away from the cutting edge of the machine during operation. Larger products and products that reduce to a large percentage of their original size tend to pull away from the edge when the air is being evacuated. Thus, the user must select a cutting blade length that leaves enough trim on each side of the cut to prevent the bag from pulling away during evacuation.

Once the blade length is selected, the user fits the vacuum packaging machine with the blade. The user then opens the lid 22 of the vacuum packaging device 18 fitted with the mechanism of the present invention, illustrated in FIG. 4. The user positions an item to be sealed with a bag 21 and places the bag 21 in the cavity 24 within the base 20 of the device 18, extending the open end 23 of the bag outside of the device.

The user then closes the lid 22, as illustrated in FIG. 4. The seal 34 on the lid 22 seals the lid against the base 20. A slight vacuum is then drawn, evacuating some of the air from within the cavity 24. This partial vacuum is drawn in order to better seal the lid 22 to the base 20, and to prevent the lid 22 from raising when the cutting blade 10 is lowered and cuts the bag 21. Care is taken, however, not to draw an excessive vacuum, as such could have the effect of rupturing the bag 21, as the air within the bag at that time has no path of escape.

The combined cutting bar 10 and heat bar 12 is then lowered into the position as illustrated in FIG. 5. In particular, air is forced through the air line 90 into the inflatable element 86 of the air bladder 36. Inflation of the air bladder 36 presses the combined cutting blade 10 and heat bar 12 downward until it engages the anvil 118, as illustrated in FIGS. 3, 6 and 7.

Most importantly, at this time the heat bar 12 is unheated. When in the extended position, the cutting bar 12 cuts the bag 21, across only the center portion of the bag, forming spaced slits therein and leaving uncut pouch trim on either side of the bag 21. Air is then removed from the air bladder 36 through the air line 90, the air bladder collapsing and the spring force generated by the springs 112 pressing the mechanism upwardly into the lid 22 as illustrated in FIG. 2. At the same time, full vacuum is drawn within the device 18, drawing the remaining air from the cavity 24 and the bag 21. The air in the bag 21 escapes through the slits cut in it by the cutting blade 10.

The heat wire 52 of the heat bar 12 is then heated, and the mechanism lowered to the positioned illustrated in FIG. 3 again. At this time, the heat bar 12 melts the bag 21 closed inward of the slits. The mechanism is again raised, air returned to the cavity 24, such as by venting to the outside atmosphere, and the user opens the lid. The user then removes the sealed bag 21. If desired, the user may then open the slit area by breaking the portions of the perforated slit which are still attached to one another. With the slit open, the remaining pouch with the center slit can serve as a handle for the convenient carrying of the packaged articles.

Notably, the cutting blade 10 extends below the heat bar 12 a sufficient distance to cut through the bag 21 when the mechanism is lowered against the anvil 118. This extension distance is chosen, however, so that the heat bar 12 still contacts the bag 21 as necessary to melt the bag closed. At the same time, the teeth 44 of the blade 10 do not penetrate so far into the anvil 118 so as to become lodged or stuck, which would hinder operation of the machine.

The sequence of (1) pulling initial vacuum; (2) lowering mechanism to cut the bag; (3) raising the mechanism and pulling full vacuum; (4) heating heat bar and lowering mechanism to seal bag; and (5) raising mechanism is preferably accomplished with relays or the like so as to be automatic.

While an air bladder 36 has been described as the preferred actuating device, many other similar mechanisms could be employed. For example, hydraulic or air cylinders could be used to move the combined cutting blade and heat bar up and down.

Further, the specific configuration of the heat bar or connecting apparatus could be change substantially without falling from the scope of the invention. A wide variety of heating elements are well known in the art, and may be employed instead of the one described herein.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A vacuum packaging method comprising the steps of:
positioning a bag for sealing which presents an open end and a closed distal end, said open end defined by two adjacent, face-to-face plies and having laterally spaced apart side margins;
forming an elongated cut line in said bag through both of said plies and proximal to said open end, said cut line extending only partially across said width leaving an uncut trim section between each end of the cut line and the adjacent side margin;
evacuating air from the inside of the bag through said cut line; and
sealing said bag across said entire width along a sealing area located between said cut line and said distal end,
said cut line being of a length and orientation to define, with adjacent uncut portions of the sealed bag, a handle for carrying of the sealed bag.

2. The method of claim 1, said forming and sealing steps being carried out by use of a combined cutting blade and heating bar.

3. The method of claim 2, said combined blade and heating bar being coupled to the lid of a vacuum packaging apparatus.

4. The method of claim 1, said forming step comprising the step of extending a cutting blade against said bag.

5. The method of claim 4, said extending step comprising the step of inflating an air bladder operatively connected with said cutting blade.

6. The method of claim 1, said sealing step comprising the step of extending a heating bar against said bag.

7. The method of claim 1, said cut line being formed as a perforation line which may be fully opened to form said handle.

* * * * *